Figure 1:
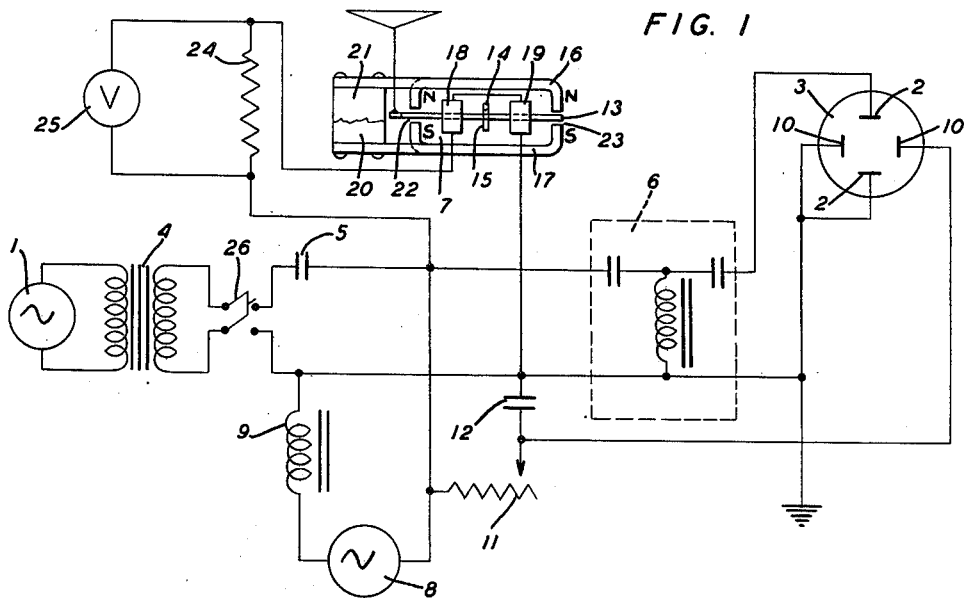

Dec. 19, 1950     C. L. WARREN     2,534,565
METHOD AND APPARATUS FOR TESTING VIBRATION TRANSLATING
DEVICES BY MEANS OF AN OSCILLOSCOPE PATTERN
Filed Sept. 21, 1945

INVENTOR
C. L. WARREN
BY
W. C. Parnell
ATTORNEY

Patented Dec. 19, 1950

2,534,565

UNITED STATES PATENT OFFICE 2,534,565

METHOD AND APPARATUS FOR TESTING VIBRATION TRANSLATING DEVICES BY MEANS OF AN OSCILLOSCOPE PATTERN

Chester L. Warren, Union, N. J., assignor to Western Electric Company, Incorporated, New York, N. Y., a corporation of New York Application September 21, 1945, Serial No. 617,861

11 Claims. (Cl. 179—175.1)

1

This invention relates to a method of and apparatus for testing vibration translating devices, such as armature type telephone transmitters and receivers, and the object of the invention is to facilitate the testing and adjustment of such devices.

In the manufacture of these devices, such, for example, as sound power telephones, it is necessary to adjust the armatures accurately to magnetic center between the pole pieces and to magnetize the units to the highest possible degree consistent with a reasonable variation of efficiency over the operating range of armature vibration.

Other methods for making these tests have been proposed heretofore, but they involved making a series of individual measurements which are time consuming and tedious and therefore not well suited to the testing of commercial production.

According to this invention, the efficiency of such a device is rapidly tested at any desired signal frequency and over any desired range of signal amplitude by subjecting the device to the combined action of a current of signal frequency and a second alternating current of a low frequency and of the amplitude which produces the desired excursion of the armature from its neutral position. The effect of the signal frequency on the device at a number of armature positions corresponding to the ratio of the two frequencies is observed simultaneously and these simultaneous indications are used as a guide in adjusting the constants of the device to the values desired.

In one embodiment of the invention, this is conveniently accomplished by means of an oscilloscope having two orthogonal pairs of deflector plates, one pair of the plates being energized by the signal potential across the unit under test, the other pair by the source of low frequency current.

With this system, the impedance of the unit under test varies with the armature position in accordance with the efficiency of the unit at each position and this variable impedance results in producing on the oscilloscope screen, a persisting pattern having ordinates of different lengths, each representing the efficiency of the unit at the corresponding armature position. When the armature is in exact magnetic center, the pattern is symmetrical and any departure from this position may be quickly corrected by adjusting the armature mounting while observing the oscilloscope. Similarly, since the pattern shows the efficiency of the device over the whole range of armature vibration of interest, the magnetization of the device may be readily changed empirically as required to bring the variation in response within the desired limits.

These and other features of the invention will be clearly understood from the following detailed description and the drawing in which Fig. 1 is a testing system according to the invention; and Figs. 2 to 5 are representations of the oscilloscope pattern under various operating conditions of the system of Fig. 1.

In Fig. 1 the source 1 of the signal frequency may be a conventional, preferably variable frequency oscillator, connected to the plates 2, 2 of the cathode ray tube 3 of the oscilloscope by a suitable circuit including an impedance matching transformer 4, a condenser 5 and a high pass filter 6. The device 7 under test is bridged across this circuit between the condenser and the filter and the source 8 of current of a low frequency is connected to the circuit at the same point through a retard coil 9.

With this circuit configuration and a proper choice of constants for the coil, condenser and filter in accordance with well known principles of circuit design, the coil 9 is of sufficient impedance at the frequency of the source 1 to prevent undue loading of the signal circuit, the condenser 5 effectively blocks the low frequency current out of the source 1 and the filter 6 rejects the low frequency current, but passes the signal frequency to the plates 2, 2.

The device under test is therefore energized by current from both the sources 1 and 8, the plates 2, 2 of the tube 3 are subjected only to the signal frequency potential and the plates 10, 10 of the tube are subjected only to the low frequency potential which is supplied thereto at the required value under the control of the variable resistor 11. This resistor, in combination with a condenser 12 in shunt to the plates 10, 10, to by-pass the 400 cycle current also serves as a network for adjusting the relative phases of the voltages applied to the two sets of plates to produce a single pattern on the screen.

The vibrating armature unit 7 under test may be of the general type disclosed in Patent 1,365,898 granted to H. C. Egerton, January 18, 1921, for example, and consists essentially of an armature 13 pivotally mounted on spring members 14 and 15 for vibration between pole pieces 16 and 17, signal coils 18 and 19 disposed on opposite sides of the pivot mounting and permanent magnets 20 and 21 for producing flux in the air gaps 22 and 23. The coils of the unit are energized through a series resistor 24 which forms a part of a convenient means of adjusting the magnitude of the low frequency current applied to the unit.

If, for example, the voltmeter 25 is of the usual type which indicates .01 volt R. M. S. value, when connected across a resistor of 1.0 ohm carrying a R. M. S. current of .01 ampere, then by making resistor 24 equal to 1.414 ohms, the meter will read directly in the peak current values which determine the amplitude of the armature excursions at the low frequency. This meter may then be used to adjust the current from the source 8 to the equivalent, from the standpoint of armature deflection, of any given value of direct current or armature displacement at which the device is to be tested. The actual armature motion produced by a given low frequency current may be readily determined for each type of unit to be tested by subjecting it to a direct current of the amplitude of the peaks of the low frequency current and measuring the armature deflection with a shadowgraph or other conventional optical apparatus. The amplitude of the signal frequency from the source 1 will ordinarily be relatively low in order to minimize the error in the meter indication produced by the signal frequency in the resistor 24. However, if in any case this error is not negligible, it can be eliminated readily by opening the switch 26 in the signal circuit while adjusting the low frequency current to its proper value.

When the unit under test is energized by any single, signal frequency, its acoustic output and electrical impedance will vary with the amplitude of the armature vibration so that the unit acts as a variable impedance shunt across the plates 2, 2 of the oscilloscope and causes it to indicate the relative efficiency of the unit at each observed armature position and by proper calibration of the oscilloscope screen, the actual efficiencies are indicated directly.

Figure 2:
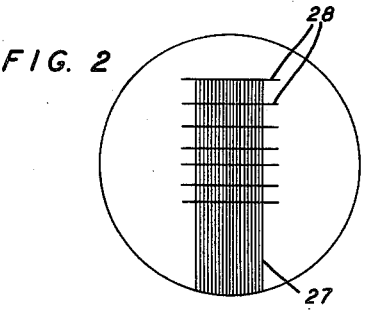
Figure 3:
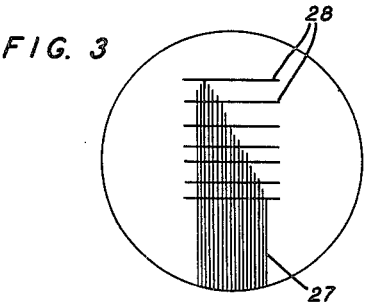

For example, with the source 1 supplying a test frequency of 400 cycles per second, the source 8 supplying an armature wabble frequency of 20 cycles per second, and the line of zero vertical deflection on the screen depressed to obtain maximum sensitivity, the oscilloscope pattern for an unmagnetized unit will be of the type shown in Fig. 2. In this figure, each of the twenty lines represents the upper portion of a sharp peak of the characteristic Lissajous figure obtained under the above conditions. The seven horizontal lines 28 are calibration marks on the screen of the tube and adjacent ones of these lines may, for example, be spaced apart the equivalent of one decibel change in the efficiency of the unit. The impedance of an unmagnetized unit will, of course, be substantially the same at all armature positions as indicated by the uniform height of the peaks and the pattern is preferably adjusted so that these peaks all terminate on the top line of the scale as shown.

In operation, the source 1 is adjusted to the frequency at which the devices are to be tested, the magnitude of the wabble frequency from the source 8 is adjusted to produce the required excursion of the armature and a device which has been magnetized to at least the maximum permissible extent, is connected in the circuit, as shown, to determine whether or not it meets requirements as to accuracy of armature centering and degree of stabilization. Such a device will produce some such pattern as that indicated in Fig. 3 in which the unsymmetrical nature of the pattern shows that the armature is not magnetically centered and in which the wide variations in the heights of the lines 28 show that the efficiency varies considerably with the position of the armature.

Figure 4:
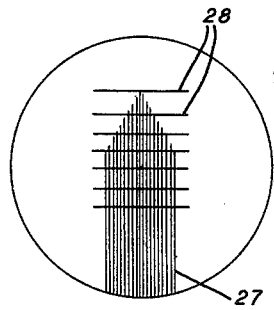
Figure 5:
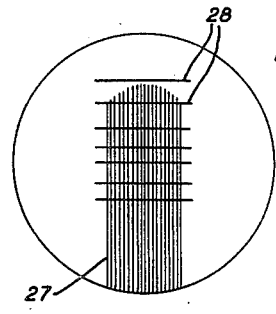

In the case of the unit shown, the armature is brought to magnetic center by adjusting the mounting springs 14 and 15 until the signal pattern becomes symmetrical as shown in Fig. 4. It should be noted that this centering rarely can be effected merely by bringing the armature to exact mechanical center between the pole pieces, since in most cases, due to slight structural imperfections, non-uniformity of materials or various other reasons, the magnetic center will not coincide with the mechanical midpoint. However, since the efficiency is a maximum at magnetic center and, for a very highly magnetized unit falls off rather sharply as the armature moves off center in either direction as indicated in Fig. 4, centering may be effected by this method in a very easy and expeditious manner.

Having the device in the condition represented by Fig. 4, it is necessary merely to reduce the magnetization of the magnets until the efficiency variation with armature position is brought within limits desired in a particular case. If, for example, the efficiency must not vary more than one decibel, the magnet strength is reduced until the pattern assumes the form shown in Fig. 5 where all the peaks 27 lie between the two uppermost lines 28.

While the invention has been explained with reference to a particular circuit for purposes of illustration, the method and apparatus may be modified in various ways within the scope of the following claims:

1. The method of testing and adjusting armature type vibration translating devices which comprises subjecting the device to be tested simultaneously to the action of a current of the test frequency and of a second alternating current of low frequency and of an amplitude sufficient to wabble the armature over the required range of armature vibration, producing simultaneous indications of the effect on the device of the current of the test frequency at a plurality of intermediate armature positions, and using said simultaneous indications as a guide in adjusting the constants of said device.

2. The method of testing and adjusting vibration translating devices having armatures mounted for vibration between spaced pole pieces, which comprises subjecting the device to be tested simultaneously to the action of a current of the test frequency and of a second alternating current of low frequency and of an amplitude sufficient to wabble the armature over the required range of armature vibration, producing simultaneous indications of the effect on the device of the current of the test frequency at a plurality of armature positions regularly spaced throughout the range of armature vibration, and using said simultaneous indications as a guide in adjusting the armature of the device to a normal position in which it is magnetically centered between the pole pieces.

3. The method of testing and adjusting armature type vibration translating devices having means for producing a magnetic field for the armature, which comprises subjecting the device to be tested simultaneously to the action of a current of the test frequency and of a second alternating current of low frequency and of an amplitude sufficient to wabble the armature over the required range of armature vibration, producing simultaneous indications of the effect on the device of the current of the test frequency at a plurality of armature positions, the number of positions being determined by the ratio of the two frequencies, and using said simultaneous indications as a guide in adjusting the strength of the magnetic field to control the variation in the effect on the device produced by the displacement of its armature.

4. The method of testing and adjusting armature type vibration translating devices having means for producing a magnetic field for the armature, which comprises subjecting the device to be tested simultaneously to the action of a low amplitude current of the frequency at which the device is to be tested and of a second alternating current of low frequency and of an amplitude sufficient to wabble the armature over the required range of armature vibration, measuring the impedance of the device to the currents of test frequency at a plurality of the positions assumed by the armature under the influence of the wabble current and adjusting the strength of the magnetic field to control the degree of variation in the impedance of the device produced by the displacement of its armature.

5. Apparatus for testing armature type translating devices having signal coils mounted on their armatures and varying in effective impedance in accordance with the position of the armature, said apparatus comprising an oscilloscope having two orthogonal pairs of deflector plates, a source of test frequency connected to one pair of the plates and a source of wabble frequency connected to the other pair of plates, means for varying the relative phase of the two frequencies to produce a Lissajous figure consisting of a series of sharp peaks of a number equal to the ratio of the frequencies, and means for connecting the coil of a device to be tested to both of the sources and effectively in shunt to the first pair of plates to modify the height of the peaks in accordance with the changes in the impedance of the coil of the device.

6. Apparatus for testing vibrating armature type translating devices comprising an oscilloscope having two orthoganol pairs of deflector plates, a source of test frequency connected to one pair of the plates, a source of wabble frequency connected to the other pair of plates, said frequencies bearing a ratio to each other numerically equal to the number of armature positions at which the devices are to be tested, means for adjusting the relative phases of the frequencies applied to the two pairs of plates to produce on the oscilloscope a persisting pattern consisting of sharp peaks equal in number to the ratio between the two frequencies and a circuit for connecting devices to be tested across said one pair of deflector plates for controlling the amplitude of the response of the oscilloscope to the wabble frequency.

7. Apparatus for testing vibrating armature type translating devices comprising an oscilloscope having two orthoganol pairs of deflector plates, a source of test frequency connected to one pair of the plates, a source of wabble frequency connected to the other pair of plates, means for excluding the wabble frequency from said one pair of plates and from the source of test frequency, means for preventing the source of wabble frequency from unduly loading the source of test frequency and means for controlling the amplitude of the response of the oscilloscope to the wabble frequency.

8. The method of determining the relative efficiency of a vibrating armature type translating device at a given frequency of armature vibration about different medial armature positions, said device having an electrical impedance varying with the position of its armature, which method comprises moving the armature successively and cyclically through said different positions, simultaneously subjecting the device to the action of a current of the given frequency and producing indications simultaneously of the impedance of the device to the current at each of the armature positions.

9. Apparatus for testing vibrating armature type translating devices having signal coils on their armatures, said apparatus comprising an oscilloscope having two orthoganol pairs of deflector plates, a source of test frequency connected to one pair of the plates, a source of armature wabble frequency connected to the other pair of plates, means for connecting the coil of a device to be tested to both of the sources, means for controlling the amplitude of the response of the oscilloscope to the wabble frequency, a resistor in series with the source of wabble frequency and the coil and a meter connected across the resistor for producing an indication proportional to the armature wabble produced by the wabble frequency.

10. Apparatus for testing vibrating armature type translating devices comprising an oscilloscope having two orthoganol pairs of deflector plates, a source of test frequency connected to one pair of the plates, a source of wabble frequency connected to the other pair of plates, a circuit including a resistor for energizing a device to be tested from both of the sources to vibrate its armature, and a peak reading volt meter connected across the resistor to indicate the amplitude of the armature vibrations.

11. Apparatus for testing vibrating armature type telephone instruments having coils energizable to move their armatures, the apparatus comprising an oscilloscope having two orthogonal pairs of deflector plates, a source of test frequency connected to one pair of the plates, a source of wabble frequency connected to the other pair of plates, means for operatively connecting the coil of an instrument to be tested to both of the sources, means in the connection between the test frequency source and said one pair of plates for suppressing currents of the wabble frequency and means associated with said other pair of plates for suppressing currents of the test frequency.

CHESTER L. WARREN.

REFERENCES CITED

The following references are of record in the file of this patent:

UNITED STATES PATENTS

| Number | Name | Date |
|---|---|---|
| 2,162,009 | Goldsmith | June 13, 1939 |
| 2,175,001 | Sherman | Oct. 3, 1939 |
| 2,212,634 | Buckingham | Aug. 27, 1940 |
| 2,224,909 | Hackley | Dec. 17, 1940 |
| 2,435,680 | Goldsmith | Feb. 10, 1948 |